United States Patent
Dausmann et al.

[11] Patent Number: 5,943,144
[45] Date of Patent: *Aug. 24, 1999

[54] PROCESS FOR THE MANUFACTURE OF NON-REPLICABLE HOLOGRAMS POSSESSING AUTHENTICITY FEATURES AND A READING DEVICE TO CHECK AUTHENTICITY

[75] Inventors: Günther Dausmann, Erding; Klaus Gnadig, Munich; Zishao Yang, Erding, all of Germany

[73] Assignee: Bundesdruckerei GmbH, Berlin, Germany

[*] Notice: This patent is subject to a terminal disclaimer.

[21] Appl. No.: 08/710,984

[22] Filed: Sep. 25, 1996

[30] Foreign Application Priority Data

Nov. 3, 1995 [DE] Germany .................... 195 41 071

[51] Int. Cl.$^6$ .................................................. G03H 1/00
[52] U.S. Cl. .............................. 359/2; 359/12; 359/28
[58] Field of Search ............................. 359/2, 10, 11, 359/12, 28

[56] References Cited

U.S. PATENT DOCUMENTS 3,894,756  7/1975  Ward ........................................ 359/2
5,825,514  10/1998  Dausmann et al. .................... 359/2

FOREIGN PATENT DOCUMENTS 6-110377  4/1994  Japan ......................................... 359/2
6-110379  4/1994  Japan ......................................... 359/2

OTHER PUBLICATIONS

Translation of Japanese patent publication 6–110377, "Method and Device for Confirmation using Hologram", Apr. 1994.

Primary Examiner—Cassandra Spyrou
Assistant Examiner—Darren E. Schuberg
Attorney, Agent, or Firm—Jacobson, Price, Holman & Stern, PLLC

[57] ABSTRACT

A process for the manufacture of non-replicable holograms possessing authenticity features which are copies of a master hologram. To form a master hologram, a hologram is taken of a randomly structured optical element, for example of a ground glass screen or a diffusor. The resulting hologram forms an authenticity feature, with an optical system which leads to a hologram with a pattern of lines that are parallel to one another.

17 Claims, 3 Drawing Sheets

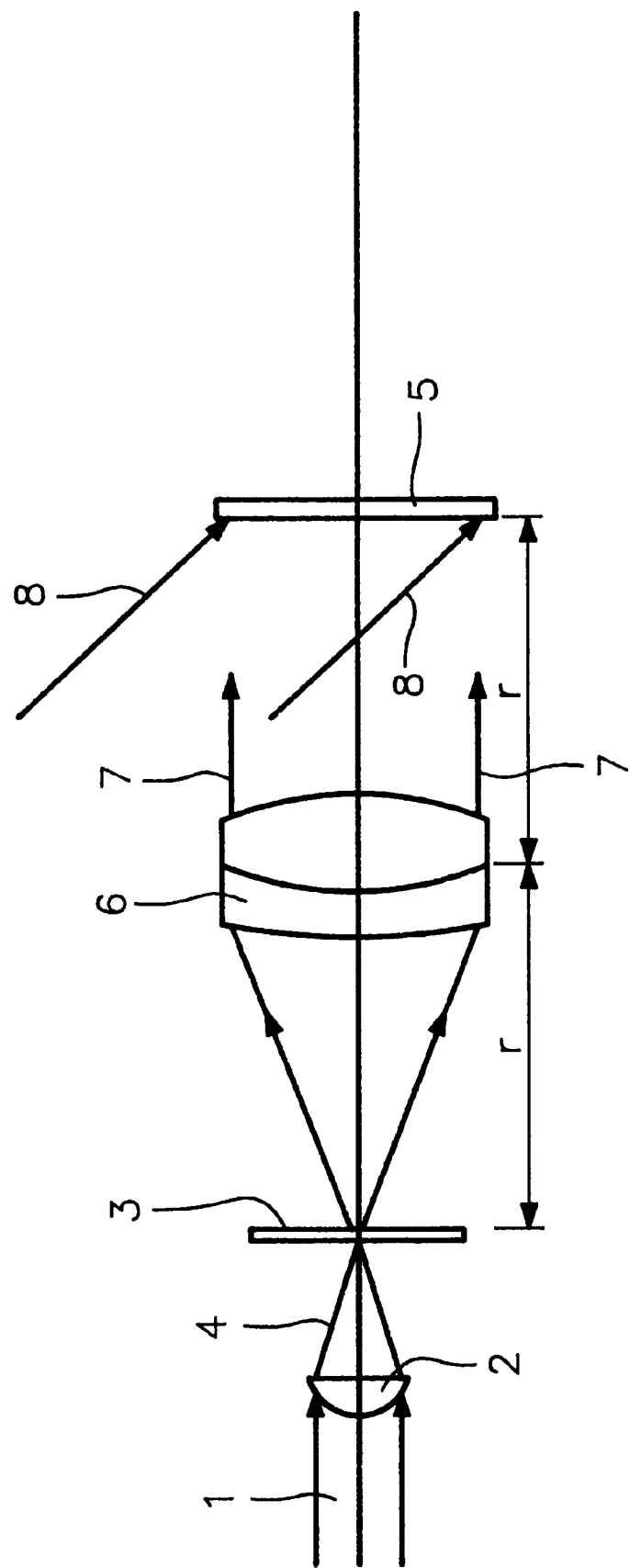

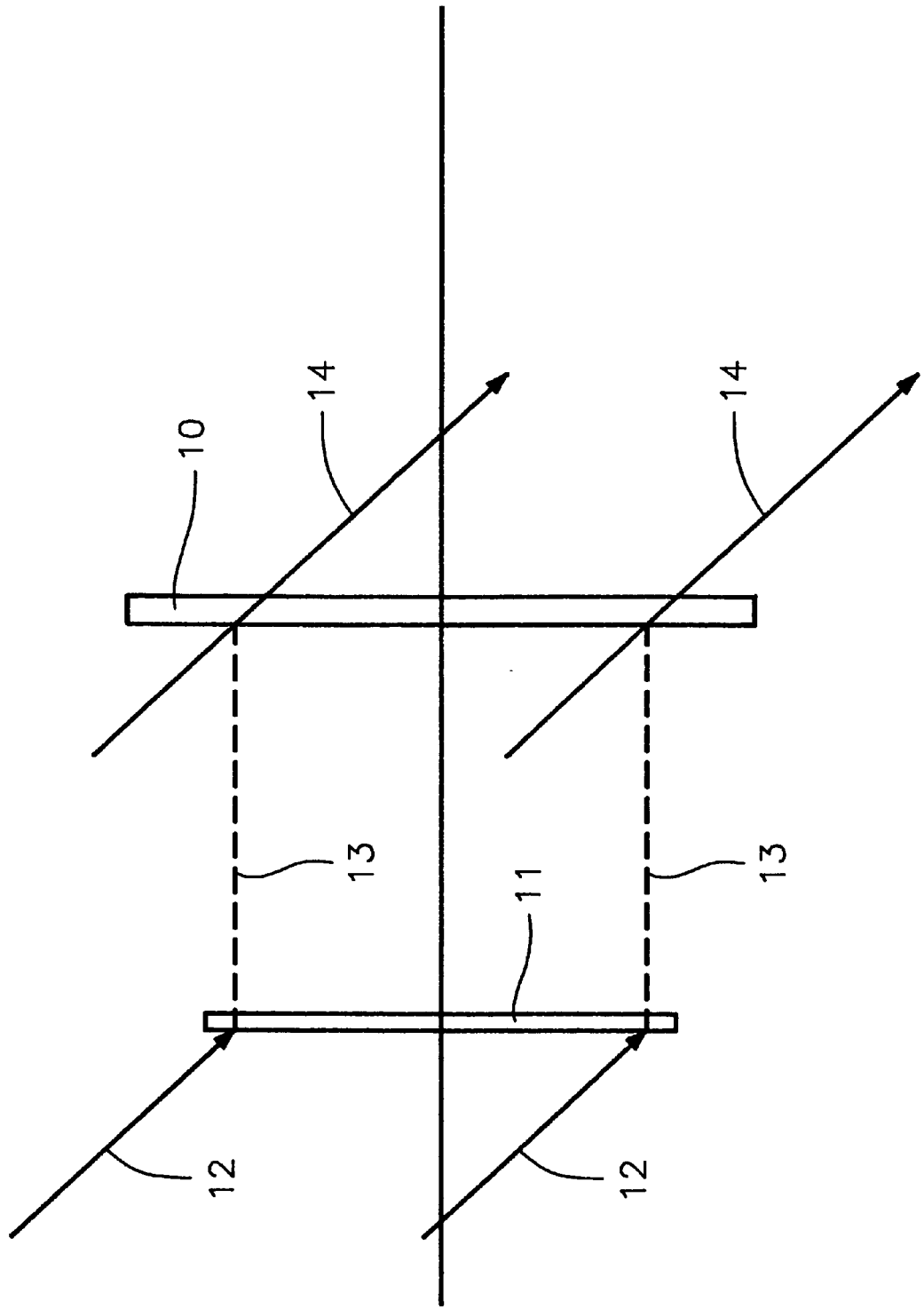

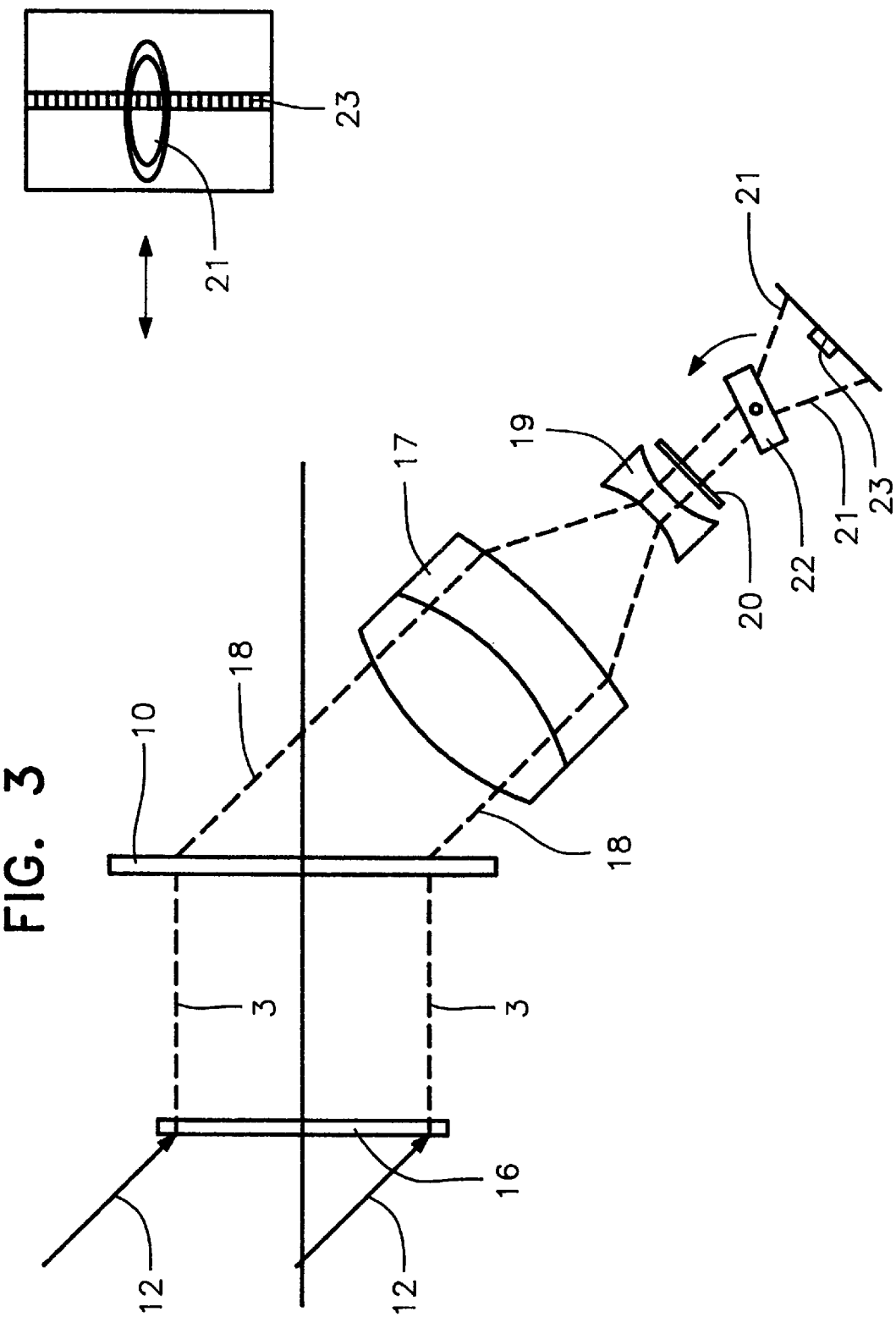

PROCESS FOR THE MANUFACTURE OF NON-REPLICABLE HOLOGRAMS POSSESSING AUTHENTICITY FEATURES AND A READING DEVICE TO CHECK AUTHENTICITY

BACKGROUND OF THE INVENTION

1. Field of the Invention

The present invention relates to a process for the manufacture of non-replicable holograms possessing authenticity features which are the copies of a master hologram and a reading device to check the authenticity of holograms manufactured according to this process.

2. Description of the Related Art

Holograms are used in particular in the form of embossed holograms increasingly on identity papers and to secure authenticity on brand articles. But holograms can only give their desired protective function if they cannot be replicated with conventional holographical means by skilled and practiced forgers either.

SUMMARY OF THE INVENTION

The object of the present invention is to create a process of the type mentioned above which allows the manufacture of non-replicable holograms which can be used as proof of authenticity on objects and documents of all types and which can be checked reliably and quickly as to their authenticity in reading devices.

This object is solved in accordance with the invention by taking with an optical system a hologram as the master hologram of a randomly structured optical element, for example of a ground glass screen or a diffusor, which forms the authenticity feature where said optical system leads to a hologram with a linear pattern.

In checking the authenticity of holograms, it is in effect necessary to put these in a testing position in which they are aligned in accordance with the microstructure of their interference pattern; this is basically only possible with a large effort. The hologram manufactured in the process in accordance with the invention possesses a linear pattern comprising lines parallel to one another so that it is relatively insensitive to displacement in the direction of the lines during the reconstruction of the hologram to be tested. If the hologram aligned parallel to the lines of the linear pattern is now moved laterally to the lines during the reconstruction of the hologram to be tested, the correct test position is reached at one point so that the features serving the authenticity test light up and this lighting up can be detected.

In accordance with a preferred embodiment of the process in accordance with the invention, the optical system to take the master hologram consists of a system in which the object ray is imaged on the diffusor or ground glass screen through a cylindrical lens and the object ray wave is aligned in a roughly parallel manner through a following imaging optical system (Fourier lens) and is brought to interference with a reference ray on the hologram plane so that the master hologram is created in the form of a pattern of parallel lines on the sensitive material arranged in the hologram plane.

The randomly structured optical element encoded in the master hologram in accordance with the invention, for example, a ground glass screen or a statistical phase plate with random distribution of the phase elements cannot be imitated by a skilled forger either because for this purpose he would need the optical element appropriately destroyed after the taking procedure, which optical element would not be available and which could not be subsequently manufactured due to its random structures. Thanks to the master hologram, which is a hologram photograph of a randomly structured optical element, imitation by replication is prevented.

A forger cannot practically not reconstruct the identical master hologram from the security holograms, which are copies of the master hologram, manufactured on the basis of the master hologram because for this purpose he would need the reference ray used in the taking of the security holograms which ray may also be additionally slightly distorted in a non-reproducible manner.

The security holograms in accordance with the invention can be taken as reflection holograms or also as transmission holograms.

For the mass production of security holograms serving as proof of authenticity, for example, an embossing punch is made from the master hologram in a known process and with this the security holograms can be embossed in a process also known in aluminized or also in transparent plastic films.

In order also to make the security holograms in accordance with the invention non-copyable, known copy-safeguards can be provided. An effective protection against copying is produced, for example, by embossing the security holograms into a film provided with graduated colours.

As the mass holograms manufactured from the master hologram manufactured in accordance with the invention possess coded hologram information, special reading devices will have to be made with which the holograms can be recognized as authentic.

Such reading devices must be able to be manufactured at reasonable prices and they must allow a simple and fast check of the holograms serving as proof of authenticity.

Such a reading device to check the authenticity of hologram copies manufactured from the master hologram is characterized in accordance with the invention in that in a given optical array with a laser, preferably with a laser diode, a hologram (decoding or reading hologram) of the master hologram is manufactured with a reference ray which possesses readable information, preferably a characteristic energy distribution, in that the reading device identically possesses the optical array used in the taking process with the hologram copy to be checked being positioned in the place of the master hologram during the manufacture of the decoding hologram, in that the hologram to be checked is impinged on by the reconstruction ray used in the manufacture of the decoding hologram and the ray reconstructed from the reconstructed ray from the reading hologram impinges on a sensor which detects the light intensity through a converging lens, a diverging lens and a cylindrical lens or a cylindrical lenticular screen (lenticular or mono-diinensional diffsor). The sensor which detects the light intensity can be a CCD sensor whose sensor elements are arranged in a row.

In the reading device in accordance with the invention an authentic hologram to be checked reconstructs the new reference ray used during the taking of the reading hologram from the reading hologram which ray appropriately possesses a typical energy distribution. The converging lens reduces the diameter of the reconstructed reading wave which is then brought into parallel through the diverging lens when it has been brought down to a sufleciently small diameter. The combination of converging lens and diverging lens is known as a Galflean telescope. So that now the reconstructed reading wave can be checked as to its typical energy distribution, it is pulled apart through the cylindrical lens so that the longitudinal axis of the ray pulled apart definitely intersects the longitudinal axis of the sensor aligned laterally to it.

Only an authentic hologram to be checked can reconstruct from the reading hologram the reading wave with the energy distribution serving as an authenticity feature so that this energy distribution is detected by the sensor and then forms an authenticity signal.

Laser beams have the idiosyncrasy that they possess so-called speckle or granulation, 1i.e. they contain a grain with light and dark speckles. If now such a dark speckle is incident to the sensor, then an error message is given even in the event of authenticity of the hologram to be checked. In order to disable the granulation, in a further embodiment of the invention a rotating glass plate is provided which balances out the granulation so that the detector can detect the energy distribution. Appropriately, the glass plate rotates with a frequency attuned to the frequency of the detector.

Other methods of granulation suppression can also be used. Thus, for example, a surface sensor can be used instead of a linear CCD sensor and the granulation be eliminated by balancing over the individual rows of the detector elements.

In another embodiment of the invention it is provided that the hologram to be checked can be rotated in the reading device through an axis parallel to the hologram lines and that it is provided with a rotating drive. The hologram to be checked must be aligned along straight edges in the reading device without an exact alignment in the direction of the hologram lines needing to be achieved. If now the hologram to be checked is moved or rotated during the test process in such a way that the hologram lines are moved laterally to their longitudinal direction, the hologram at one point comes into its exact test position so that an authentic hologram causes a lighting up of the reading ray with the typical energy distribution which lighting up can then be detected by the detector.

BRIEF DESCRIPTION OF THE DRAWINGS

The preferred embodiment of the invention is explained in greater detail below using the drawing in which FIG. 1 shows the array of the optical elements in the system to take the master hologram in a diagrammatic representation, FIG. 2 is a diagram showing the optical array to take the decoding or reading hologram in the reading device, FIG. 3 the array of the optical elements of the optical system in the reading device to check the authenticity of holograms to be tested in a diagrammatic representation, and FIG. 4 a top view of the sensor impinged on by the test ray.

DETAILED DESCRIPTION OF THE PREFERRED EMBODIMENT

Referring to FIG. 1 a description is now given of the taking of the master hologram which is used as the basis for the mass production of the holograms serving as proof of authenticity and for the manufacture of the reading hologram in the reading device.

A laser ray 1 passes through a cylindrical lens 2 which images the object ray in linear form 4 on the ground glass screen 3 which represents a randomly structured optical element. Between the ground glass screen 3 and the hologram plate 5 comprising a photosensitive material is positioned at a distance f from both the ground glass screen and the hologram plate 5 a Fourier lens 6 which transforms the object rays bundled in linear form on the ground glass screen 3 into a parallel wavefront 7. This parallel wavefront interferes on the sensitive material of the hologram plate 5 with the reference ray 8 so that on the sensitive material a hologram is recorded consisting of parallel lines with the line pattern being produced from the different spatial frequencies.

The master hologram taken in the hologram plane 5 contains the image of the ground glass screen 3 with the random distribution of the phase elements serving as proof of authenticity.

In FIG. 1 the optical system is shown in a top view.

The reading device and its manufacture is now described using FIGS. 2 to 4.

From the master hologram 5 or a copy of the master hologram then the reading or decoding hologram 10 is manufactured in the reading device which hologram remains later at the same position in the reading device in which it was taken. For the taking of the reading hologram, the authentic hologram 11 is placed in the reading device in the position at which later the holograms to be checked are also positioned, which hologram 11 therefore corresponds to the master hologram or a hologram copy. From the hologram 11 then a wave 13 is reconstructed with a typical instrument laser reconstruction ray 12, which wave is recorded with a typical instrument reference ray 14 onto sensitive material positioned in the hologram plane 10. The hologram 10 manufactured in this way then forms the reading hologram.

The hologram 11 can be a reflection or a transmission hologram. By means of example a transmission hologram is shown in FIG. 2.

The complete reading device is now described in its basic design by means of FIG. 3.

The hologram 16 to be checked is inserted into a holder in which it is held edge-straight or at the correct angle and at which it is roughly in exactly that position at which the hologram 11 was located for the taking of the reading hologram 10. Behind the reading hologram 10, in the ray reconstructed from this a converging lens 17 is positioned which compresses the reconstructed ray 18 to a lower diameter. The correspondingly compressed ray is then incident to the diverging lens 19 which generates a parallel ray of a low diameter. This ray is then pulled apart by a cylindrical lens or a cylindrical lenticular screen 20 (lenticular or monodimensional diffusor) in a line-like way 21 as can be seen from FIG. 4. This ray 21 pulled apart in a line-like way is then incident on the rotating glass plate 22 which can have a rectangular form. By the rotation of the glass plate 22 the granulation of the laser beam is balanced out so that a linear ray 21 is incident laterally to the detector in the manner visible from FIG. 4, in which ray the granulation is balanced out. The sensor 23 consists in the embodiment described of photosensitive elements arranged in a row (CCD sensor).

The holder of the hologram 16 to be tested can be swivelled through one axis by a drive with the axis being parallel to the lines of the linear pattern of the hologram. If now the hologram 16 to be tested is rotated during the test process, the hologram at one point comes into the correct test position so that the ray reconstructed from the hologram 16 reconstructs from the reading hologram 10 the ray 14 used for its taking which ray 14 possesses a certain energy distribution which can be detected by the sensor 22.

The cylindrical lens 20 or the cylindrical lenticular screen or the monodimensional diffusor pulls the test ray 21 so far apart that it always intersects the sensor 23.

We claim:

1. A process for the manufacture of non-replicable reading holograms possessing authenticity features which are copies of a master hologram, the process comprising taking, with an optical system including a randomly structured optical element, the master hologram and forming an authenticity feature having a pattern of lines parallel to one another wherein the optical system comprises a system in which object ray images form a linear fashion on the optical element through a cylindrical lens and in which an object wave is brought into roughly parallel alignment through subsequent imaging optics and to interference with a reference ray on photosensitive material in a hologram plane so that the master hologram is taken on the photosensitive material positioned in the hologram plane in the form of a pattern of parallel lines.

2. A process to check the authenticity of hologram copies manufactured in accordance with the process in accordance with claim 1, the process further comprising manufacturing with a laser, a reading hologram of the master hologram with a reference ray possessing reading information using the optical system used in the step of taking, the hologram copy to be tested being brought to a same position as the master hologram in the manufacture of the reading hologram, in that the hologram to be checked is impinged on by the reconstruction ray used in the manufacture of the reading hologram and the ray reconstructed from the reconstructed ray from the reading hologram impinges on a sensor detecting light intensity.

3. The process in accordance with claim 2, wherein a glass plate with a rotary drive is positioned between the cylindrical lens and the sensor.

4. The process in accordance with claim 2, wherein the hologram to be checked can be rotated in the reading device around an axis parallel to the hologram lines of the hologram to be tested and is provided with a rotary drive.

5. The process in accordance with claim 2 further comprising the step of eliminating granulation by positioning a rotating glass plate or a surface sensor before the sensor to balance out over individual rows of the detector elements.

6. An optical system for creating a master hologram from an object ray, the system comprising:

a randomly structured optical element;

a first lens for linearly imaging the object ray on said randomly structured optical element to produce linear object rays;

a second lens that transforms the linear object rays into a parallel wavefront; and, a hologram plate having sensitive material, the parallel wavefront interfering with the sensitive material with a reference ray having reading information to form the master hologram on the sensitive material.

7. The optical system of claim 6, wherein said randomly structured optical element comprising a ground glass screen or a diffusor.

8. The optical system of claim 6, wherein said first lens comprising a cylindrical lens.

9. The optical system of claim 6, wherein said second lens comprising a Fourier lens.

10. The optical system of claim 6, further comprising a reading device for creating a decoding hologram used to authenticate reproduced holograms that are copies of the master hologram, the reading device comprising a reconstructing ray passing through the master hologram to form a reconstructed wave and a hologram plane having a sensitive material, the reconstructed wave interfering with the sensitive material with a reference ray to form the decoding hologram on the sensitive material.

11. The optical system of claim 10, wherein the master hologram comprises a transmission hologram.

12. The optical system of claim 10, wherein the master hologram comprises a reflection hologram.

13. A reading device for authenticating reproduced holograms that are copies of a master hologram, the reading device comprising:

a reconstructing ray passing through the reproduced hologram to form a reconstructed wave;

a decoding hologram, the reconstructed wave passing through said decoding hologram to form a decoded reconstructed ray;

an optical element for separating the decoded reconstructed ray to form decoded reconstructed ray lines; and a sensor for authenticating the reproduced hologram based upon the decoded reconstructed ray lines.

14. The reading device of claim 13, wherein the optical element comprises a lens.

15. The reading device of claim 13, further comprising a rotating glass plate positioned between said optical element and said sensor, the rotating glass plate balancing granulation of the decoded reconstructed ray lines to be incident substantially laterally to said sensor.

16. The reading device of claim 13, wherein said sensor authenticates the reproduced hologram based upon an energy distribution of the decoded reconstructed ray lines.

17. The reading device of claim 13, wherein the optical element comprises a lenticular screen.

* * * * *